July 9, 1963 K. FISCHER ETAL 3,096,542
METHOD AND APPARATUS FOR PRODUCTION OF PARTICLE BOARD
Filed Nov. 7, 1960 2 Sheets-Sheet 1
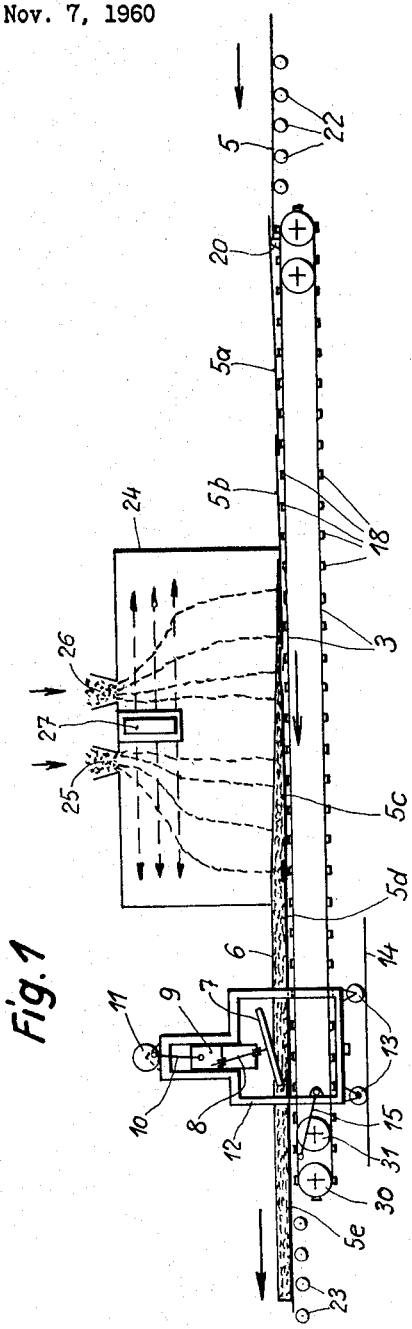

United States Patent Office 3,096,542
Patented July 9, 1963

3,096,542
METHOD AND APPARATUS FOR PRODUCTION OF PARTICLE BOARD
Kurt Fischer, Bad Munder, and Heinrich Mund, Springe, Deister, Germany, assignors to Bahre Metallwerk K.G., Springe, Hannover, Germany
Filed Nov. 7, 1960, Ser. No. 67,561
Claims priority, application Germany Nov. 11, 1959
9 Claims. (Cl. 18—4)

In the continuous production of particle board from a mat of wood particles produced at a forming station on closely alinged and uniformly moving cauls, it is necessary to provide for the length of the mat sections to be slightly smaller than the length of the cauls to account for the expansion of the mat during pressing. In order to provide this, it has been usual to separate the continuous mat into the desired lengths by two parallel cuts extending transversely of the mat. The thus-produced intermediate piece or section of the mat was usually discarded. This procedure has disadvantages even when the particles of intermediate sections can be returned to the process.

According to the present invention, the improvement in the method of continuously producing particle board from mats formed at a forming station on adjacent uniformly moving cauls of a length corresponding to the effective length of the press into which the separated equal parts of the mat are introduced, consists in bringing the cauls in an end overlapping arrangement to the forming station. The cauls retain this overlapping arrangement until the mat is formed and is ready to be separated. At that time the mat is severed above the overlapping ends of the cauls and the foremost caul is dispatched with greater speed than the next following one so that as a consequence the length of the cauls becomes greater than the length of the separated sections of the mat. Thus the desired excess of the length of the cauls compared with the length of the mat is achieved without the use of double cuts in the separating step which would lead to the production of intermediate pieces. The invention therefore simplifies the operation of a particle board plant.

The separation of the mat into equal lengths is preferably carried out by a vertically movable band saw arranged across the direction of movement of the mat. The saw blade parts move in a plane which is inclined to the direction of movement of the mat so that only one of the two parts of the saw blade is in cutting position.

The drawings show in schematic form one example for carrying out the invention.

FIGURE 1 is a schematic side elevation view of apparatus for carrying out the invention.

FIGURE 2 is a schematic top plan view of the conveyor systems shown in FIG. 1.

Figure 3:
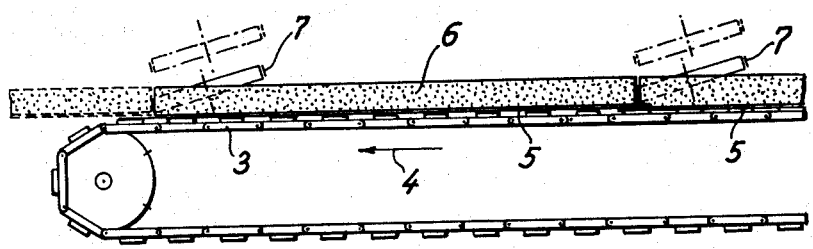
FIGURE 3 is an enlarged side elevation view of a portion of an endless conveyor with the overlapping cauls and the mat on top.

The mat forming station includes a chamber 24. The wood particles are introduced through funnels 25 and 26 from the top. Blower 27 acts toward both ends of the chamber 24 and distributes the descending wood particles outwardly toward both ends. Thus the particles are distributed during their fall and may also be sorted according to size.

Below the chamber 24 the endless chain conveyor 3 moves over sprockets 28 and 29. This chain conveyor is provided with cross-pieces 18 on which rest the cauls carrying the wood particles.

The ends of the cauls 5, 5a, 5b, etc. overlap. This is achieved by the pair of moving chains 19 provided with a cross-piece 20. Caul 5 is brought in on rolls 22 and touches the cross-piece 20 as shown in FIGURE 1. Prior to this time the cross-piece 20 has engaged and lifted the trailing edge of the caul 5a. This demonstrates the way in which the overlapping of the cauls 5, 5a, 5b, etc. is brought about.

A saw 7 has an axle 8 arranged in cylinder 9 which can be moved upwards and downwards by means of connecting rod 10 and a crank wheel 11. The frame 12 in which saw 7 and its drive are arranged moves horizontally on the wheels 13 running on rails 14. The back-and-forth movement of the frame 12 is achieved by means of rods 15 connected pivotally at one end with frame 12 and at the other end with chain 16 which runs over sprockets 30 and 31.

After leaving chain conveyor 3, caul 5e is engaged by rolls 23. These rolls have a higher circumferential velocity than chain conveyor 3. By this means caul 5e with its mat can be moved faster than cauls 5a, 5b, etc.

Figure 4:
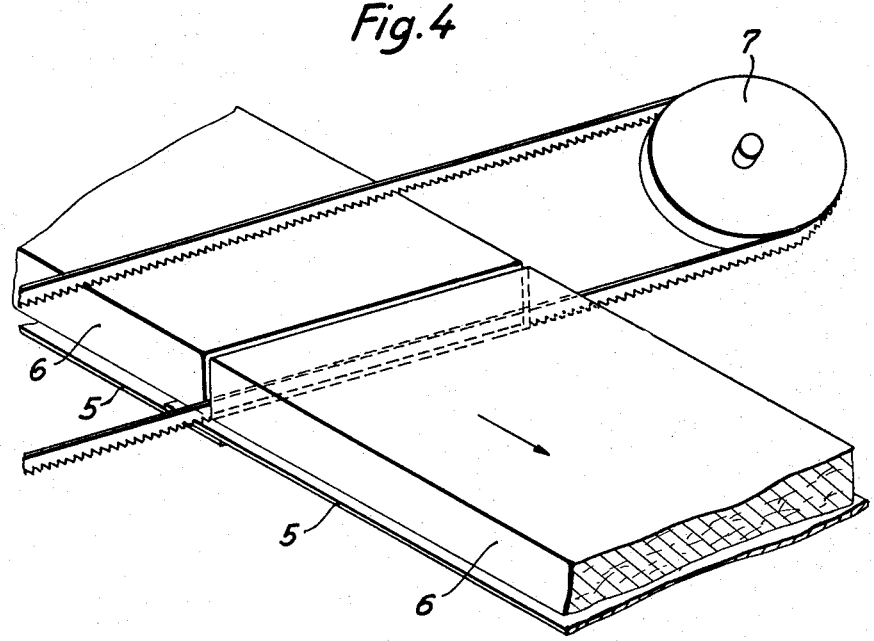
FIGURE 4 is an enlarged perspective view showing the separation of the mat.

In FIGURES 3 and 4 the endless conveyor 3 moves the cauls 5 in the direction of arrow 4. The cauls carry a mat 6 produced in the forming station 24. Cauls 5 overlap to an extent which is related to the oversize of the caul compared with the mat section formed on separating the mat. After the separation of the mat, when the caul lying foremost in the operating direction is transported off at higher speed than that of chain conveyor 3, that caul is separated from overlapping relationship with the next succeeding caul and the mat sections thereon are separated a corresponding distance from one another. Thus no surplus mat material is produced during the separation.

The separation of the mat into sections is preferably carried out by means of band saw 7 which can be raised or lowered and which has its running and returning saw blade parts in a plane which is inclined to the plane of the mat in such manner that only one of the two saw blade parts is in cutting position, as best shown in FIGURE 4.

The use of metal cauls 5 as carriers for the mat and the mat sections has proved advantageous. Conceivably, however, instead of cauls made from metal, plates made from synthetic resins or other materials could be used. Such plates would be equivalent to metal cauls.

Having thus described our invention, what we claim is:

1. A method for the continuous production of particle board from a mat of wood particles produced at a forming station on adjacent and uniformly moving cauls the length of each of which corresponds to the working length of the press into which separated equal sections of the mat are introduced, characterized by bringing the cauls into the forming station in end overlapping relationship, forming a mat thereon, separating the mat above the overlapping ends of the cauls, and moving the caul in the forward position in the operating direction at higher speed than the next following caul so that as a consequence the length of the cauls exceeds the length of the separated sections of the mat.

2. In a method for producing particle board, the steps of: advancing a plurality of cauls in end overlapping relationship; forming a mat of wood fibers on said advancing cauls; severing the mat above the overlapping ends of adjacent cauls; and separating the cauls by relative endwise movement thereof.

3. In apparatus for the production of particle board, a conveyor, a plurality of cauls in end overlapping relationship on said conveyor, means for forming a mat of wood particles on said cauls, and a vertically movable band saw having blade runs extending transversely of the direction of travel of said conveyor, said blade runs lying in a plane inclined to said direction of travel whereby one of said blade runs can be positioned to cut the mat above the overlapping ends of said cauls upon lowering said band saw.

4. A method for producing particle board comprising arranging a plurality of cauls in end to end overlapping relation on a conveyor, forming a mat on the cauls as they are advanced by the conveyor, severing the mat above the overlapping ends of adjacent cauls and separating the cauls by relative endwise movement thereof.

5. A method for depositing wood particles on cauls so that an edge of the caul is uncovered to facilitate handling of the caul when the particles are molded in a press to form particle board comprising arranging a plurality of cauls in end to end overlapping relation on a conveyor, forming a mat on the cauls while they are being advanced by the conveyor, severing the mat above the overlapping ends of adjacent cauls and separating the caul carrying the severed portion of the mat by relative endwise movement thereof whereby portions of the overlapped edges of the caul remain uncovered by the mat.

6. In apparatus for the production of particle board, a conveyor, a plurality of cauls in end to end overlapping relation on the conveyor, means for forming a mat of wood particles on the cauls, means for severing the mat above the overlapping ends of adjacent cauls and means for separating the caul supporting the severed mat from the preceding cauls on the conveyor.

7. In apparatus for the production of particle board, a conveyor, a plurality of cauls supported on the conveyor, each of said cauls having an edge overlapping an edge of an adjacent caul, means for forming a mat of wood particles on the cauls, means for sawing the mat over the overlapped edges of the cauls and means for separating the caul supporting the severed mat from the preceding cauls on the conveyor.

8. In apparatus for the production of particle board, a conveyor, a plurality of cauls supported on the conveyor, each of said cauls having an edge overlapping an edge of an adjacent caul, means for forming a mat of wood particles on the cauls, a vertically movable band saw having blade runs extending transversely of the direction of travel of the conveyor, one of the blade runs movable to a position above the overlapped edges of the cauls whereby the mat is cut intermediate the overlapping edges of adjacent cauls upon lowering the band saw.

9. In apparatus for the production of particle board, a conveyor, a plurality of cauls supported on the conveyor, each of said cauls having an edge overlapping an edge of an adjacent caul, means for forming a mat of wood particles on the cauls, a vertically movable band saw having blade runs extending transversely of the direction of travel of the conveyor, means for vertically reciprocating the saw to sever the mat, said saw and said reciprocating means being mounted on a carriage, means for moving the carriage along the length of the conveyor, said reciprocating means and said moving means positioning the saw for cutting the mat above the overlapping edges of said cauls adjacent the delivery end of the conveyor and means for separating the caul supporting the severed mat from the preceding cauls on the conveyor, whereby the caul supporting the severed portion of the mat is displaced relative to the cauls on the conveyor supporting the unsevered portion of the mat.

References Cited in the file of this patent

UNITED STATES PATENTS

| | | |
|---|---|---|
| 57,791 | Stafford | Sept. 4, 1866 |
| 2,097,613 | Batcheller | Nov. 2, 1937 |
| 2,689,975 | Leng | Sept. 28, 1954 |
| 2,916,792 | Crook et al. | Dec. 15, 1959 |
| 2,923,030 | Himmelheber et al. | Feb. 2, 1960 |